United States Patent
Hatanaka

(10) Patent No.: US 11,829,830 B2
(45) Date of Patent: Nov. 28, 2023

(54) READER/WRITER

(71) Applicants: Kabushiki Kaisha Toshiba, Tokyo (JP); Toshiba Infrastructure Systems & Solutions Corporation, Kawasaki (JP)

(72) Inventor: Issei Hatanaka, Kawasaki (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/652,958

(22) Filed: Mar. 1, 2022

(65) Prior Publication Data

US 2022/0188527 A1 Jun. 16, 2022

Related U.S. Application Data

(63) Continuation of application No. PCT/JP2020/032900, filed on Aug. 31, 2020.

(30) Foreign Application Priority Data

Sep. 3, 2019 (JP) .................... 2019-160391

(51) Int. Cl.
*G06K 7/10* (2006.01)
*G06K 7/00* (2006.01)

(52) U.S. Cl.
CPC ....... *G06K 7/0021* (2013.01); *G06K 7/10366* (2013.01)

(58) Field of Classification Search
CPC .......................... G06K 7/0021; G06K 7/10366
(Continued)

(56) References Cited

U.S. PATENT DOCUMENTS

| 6,021,944 A * | 2/2000 | Arakaki ................ G07F 7/0873 902/22 |
| 6,651,881 B1 | 11/2003 | Choiset |
| 2003/0010828 A1 | 1/2003 | Hirata et al. |

FOREIGN PATENT DOCUMENTS

| EP | 0 793 206 A2 | 9/1997 |
| JP | 09-307660 A | 11/1997 |

(Continued)

OTHER PUBLICATIONS

International Search Report dated Nov. 24, 2020 in PCT/JP2020/032900 filed on Aug. 31, 2020, 4 pages (with English Translation).

(Continued)

*Primary Examiner* — Jamara A Franklin
(74) *Attorney, Agent, or Firm* — Maier & Maier, PLLC

(57) ABSTRACT

According to one embodiment, a reader/writer includes an insertion portion and a support member. An information storage medium held by a person with fingers is inserted into the insertion portion. The support member supports the insertion portion on an installation surface by causing an insertion direction of the information storage medium with respect to the insertion portion to be lowered to the front to intersect with a horizontal plane. In the support member, an intersection angle between the insertion direction and the horizontal plane is set to a predetermined acute angle at which the fingers of the person do not interfere with the installation surface when the information storage medium is inserted into the insertion portion.

8 Claims, 10 Drawing Sheets

(58) Field of Classification Search
USPC .......................................................... 235/451
See application file for complete search history.

(56) References Cited

FOREIGN PATENT DOCUMENTS

| | | |
|---|---|---|
| JP | 11-282985 A | 10/1999 |
| JP | 11-312225 A | 11/1999 |
| JP | 2000-036027 A | 2/2000 |
| JP | 2001-101354 A | 4/2001 |
| JP | 2002-133378 A | 5/2002 |
| JP | 2003-016395 A | 1/2003 |
| JP | 2005-043950 A | 2/2005 |
| JP | 2017-117337 A | 6/2017 |

OTHER PUBLICATIONS

Extended European Search Report dated Jul. 26, 2023, in corresponding European Application No. 20861312.5, 9 pages.

* cited by examiner

READER/WRITER

CROSS-REFERENCE TO RELATED APPLICATION

This is a Continuation Application of International Application No. PCT/JP2020/032900, filed on Aug. 31, 2020, which claims priority to Japanese Patent Application No. 2019-160391, filed on Sep. 3, 2019, and the entire contents of all of the aforementioned applications are incorporated herein by reference.

FIELD

An embodiment of the present invention relates to a reader/writer.

BACKGROUND

Conventionally, a stationary reader/writer that reads from and writes on a contact type or non-contact type IC card is known. For example, a reader/writer installed at a counter or the like of a store reads and writes information when an IC card held in a person's hand is inserted into or put over a predetermined portion thereof.

DETAILED DESCRIPTION

According to one embodiment, a reader/writer includes an insertion portion and a support member. An information storage medium held by a person with fingers is inserted into the insertion portion. The support member supports the insertion portion on an installation surface by causing an insertion direction of the information storage medium with respect to the insertion portion to be lowered to the front to intersect with a horizontal plane. In the support member, an intersection angle between the insertion direction and the horizontal plane is set to a predetermined acute angle at which the fingers of the person do not interfere with the installation surface when the information storage medium is inserted into the insertion portion.

Hereinafter, a reader/writer of an embodiment will be described with reference to the drawings.

Figure 1:
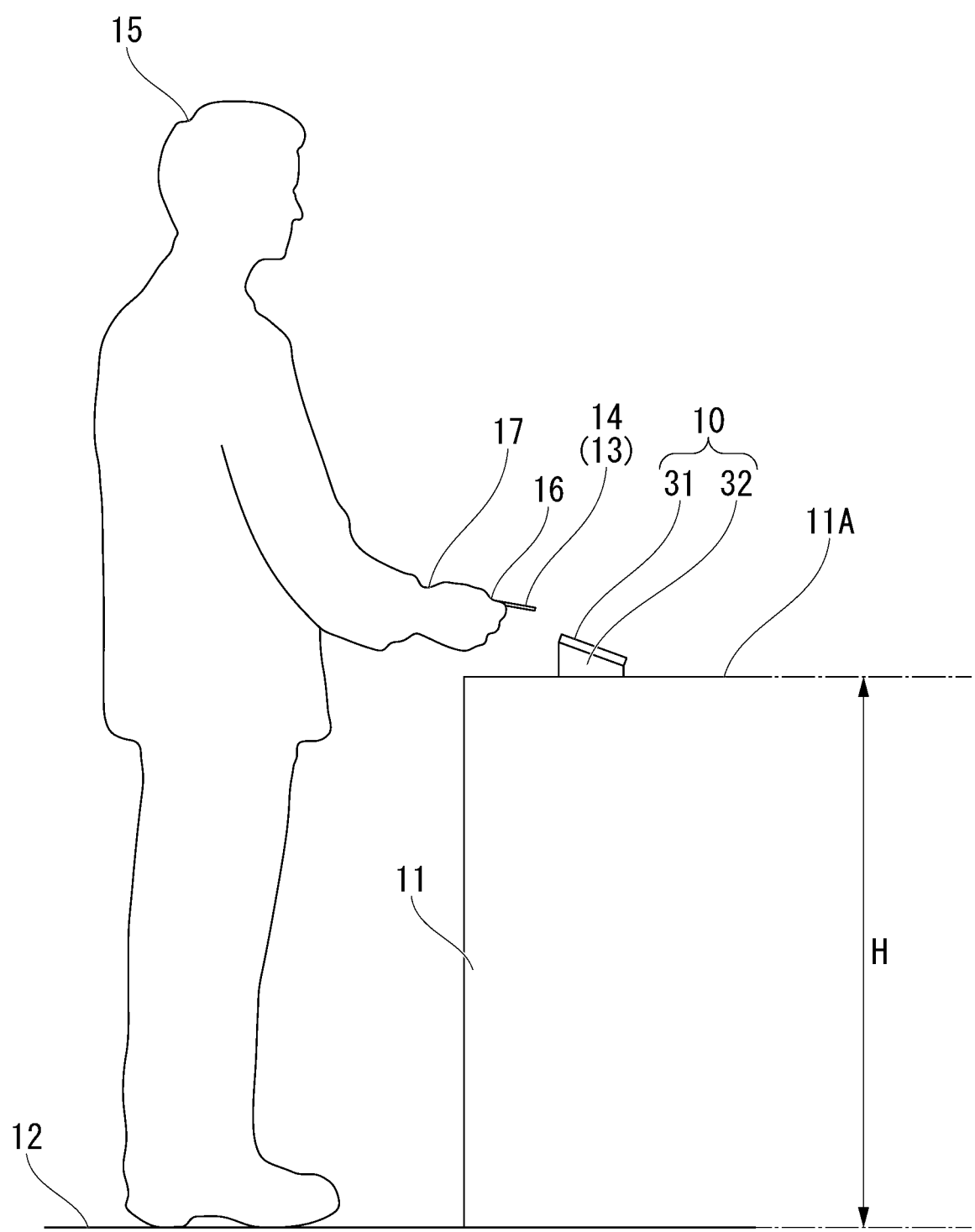
FIG. 1 is a view schematically showing a disposition state of a reader/writer of an embodiment.

FIG. 1 is a view schematically showing a disposition state of a reader/writer 10 of the embodiment.

As shown in FIG. 1, the reader/writer 10 is installed on, for example, an installation surface 11A of an installation table 11 such as a counter in a store. For example, the installation surface 11A is an upper end surface of the installation table 11 in a vertical direction. The installation surface 11A is a horizontal plane parallel to a horizontal direction. The installation table 11 is disposed on a horizontal reference surface 12. A height H of the installation surface 11A from the reference surface 12 in the vertical direction is a predetermined height.

The reader/writer 10 reads information or reads and writes information on an information storage medium 13. For example, the information storage medium 13 is an integrated circuit (IC) card 14. The IC card 14 is held by a person 15 with fingers 16 to be brought toward and away from the reader/writer 10.

Figure 2:
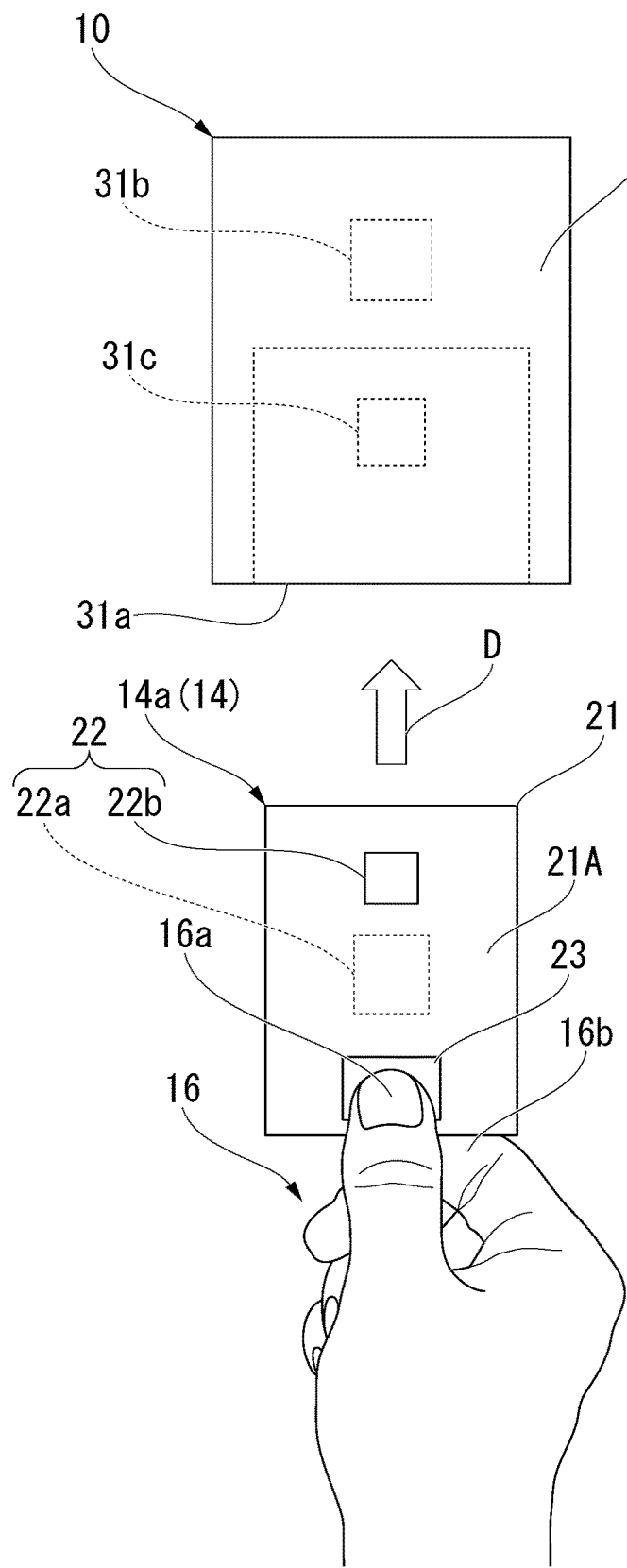
FIG. 2 is a view showing an example of a first holding method of an IC card inserted into the reader/writer of the embodiment.
Figure 3:
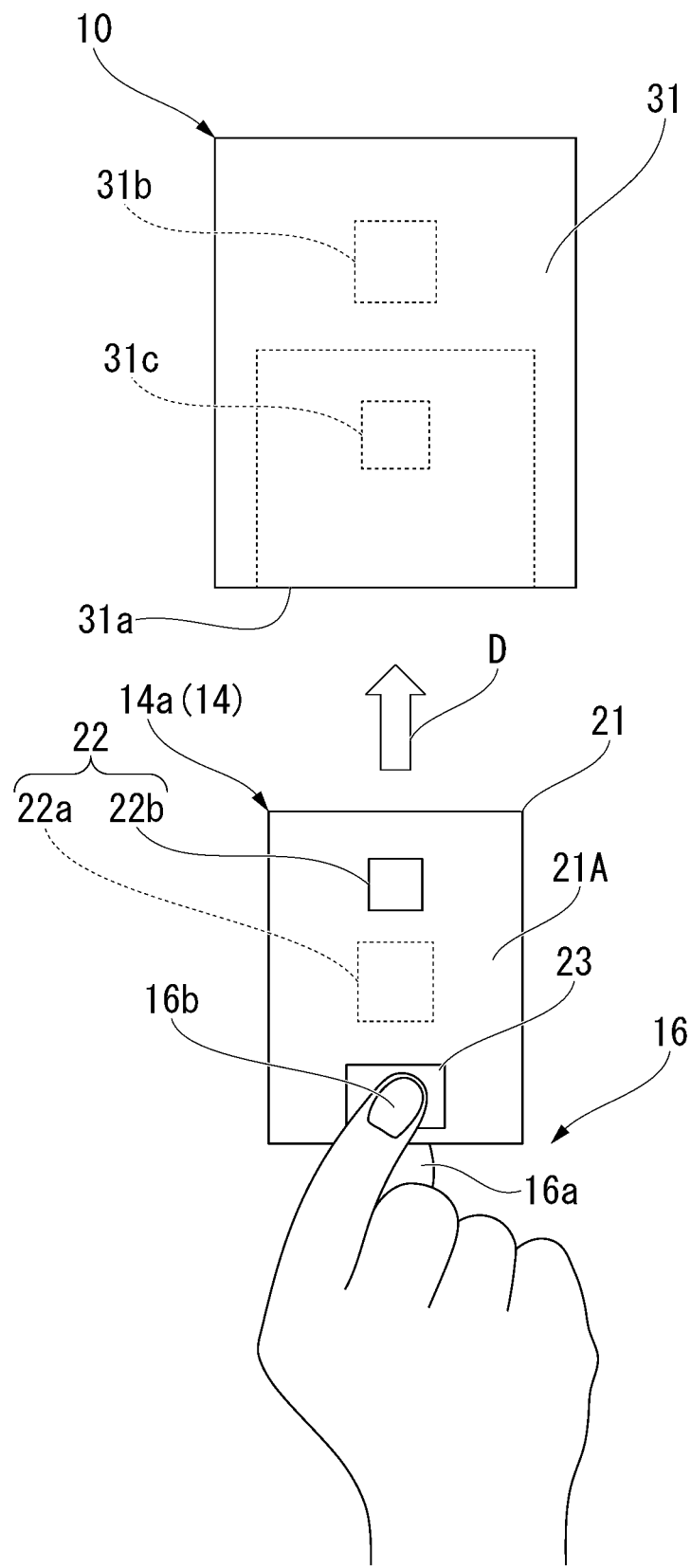
FIG. 3 is a view showing an example of a second holding method of the IC card inserted into the reader/writer of the embodiment.
Figure 4:
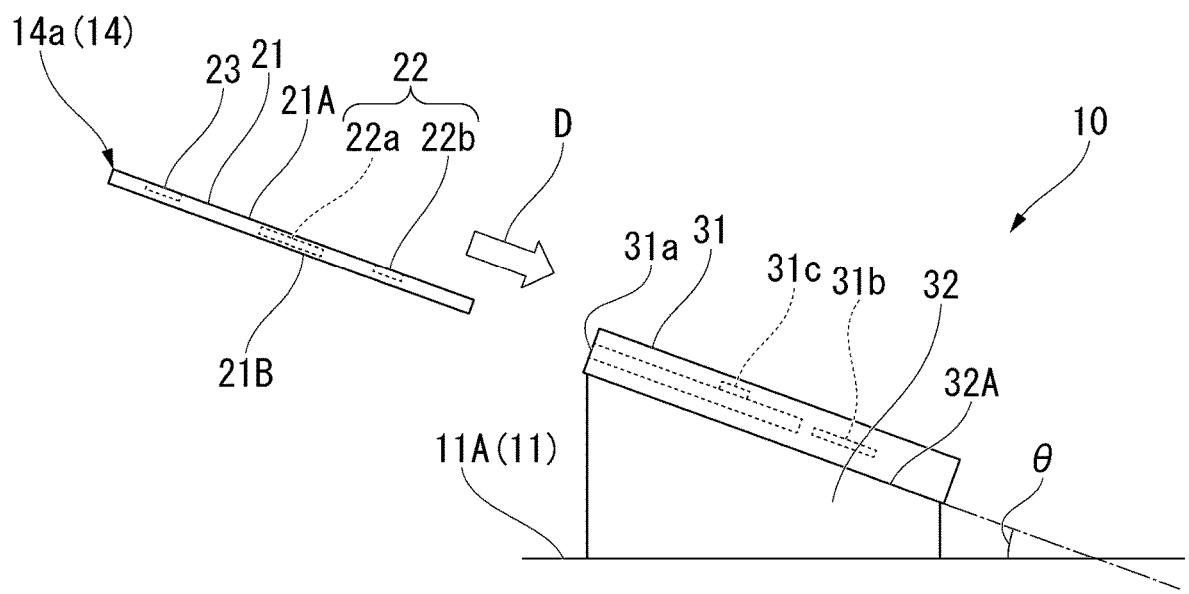
FIG. 4 is a view showing an insertion direction of the IC card with respect to the reader/writer of the embodiment.

FIG. 2 is a view showing an example of a first holding method of the IC card 14 inserted into the reader/writer 10 of the embodiment. FIG. 3 is a view showing an example of a second holding method of the IC card 14 inserted into the reader/writer 10 of the embodiment. FIG. 4 is a view showing an insertion direction D of the IC card 14 with respect to the reader/writer 10 of the embodiment.

For example, the reader/writer 10 may handle the contact type IC card 14a (14). As shown in FIGS. 2, 3, and 4, the contact type IC card 14a includes a support base 21, and an IC module 22 and a biometric authentication sensor 23 provided on the support base 21.

The support base 21 is formed of a resin material into a rectangular plate shape.

The IC module 22 includes an IC chip 22a disposed inside the support base 21, and a contact 22b provided on a first surface 21A of both sides (first surface 21A and second surface 21B) of the support base 21 in a thickness direction. The IC chip 22a includes a read-only memory (ROM), a random access memory (RAM), and a central processing unit (CPU). The ROM is a non-volatile memory such as an electrically erasable programmable read-only memory (EEPROM) or a flash ROM that holds information in the absence of power supply.

The biometric authentication sensor 23 is, for example, a fingerprint sensor. The biometric authentication sensor 23 is exposed on the first surface 21A of both sides (the first surface 21A and the second surface 21B) of the support base 21 in the thickness direction. The biometric authentication sensor 23 detects a fingerprint of a thumb 16a, an index finger 16b, or the like among the fingers 16 of the person 15. The biometric authentication sensor 23 performs fingerprint authentication using detected data of fingerprints and fingerprint data stored in advance.

For example, in the case of the first holding method shown in FIG. 2, the IC card 14a is sandwiched by the thumb 16a and the index finger 16b from both sides in the thickness direction, and the thumb 16a supports the IC card 14a from above in the vertical direction. In the case of the first holding method, the biometric authentication sensor 23 performs fingerprint authentication of the thumb 16a on the first surface 21A side of the IC card 14a.

For example, in the case of the second holding method shown in FIG. 3, the IC card 14a is sandwiched by the thumb 16a and the index finger 16b from both sides in the thickness direction, and the thumb 16a supports the IC card 14a from below in the vertical direction. In the second holding method, the biometric authentication sensor 23 performs fingerprint authentication of the index finger 16b on the first surface 21A side of the IC card 14a.

As shown in FIGS. 1 and 4, the reader/writer 10 includes an insertion portion 31 and a support member 32 that supports the insertion portion 31.

An outer shape of the insertion portion 31 may be, for example, a rectangular plate shape. An insertion slot 31a into which the IC card 14a is inserted is formed in the insertion portion 31.

The insertion portion 31 includes, for example, a control device 31b and a terminal 31c that is brought into contact with the contact 22b of the contact type IC card 14a.

The control device 31b is a software function unit that functions when a predetermined program is executed by a processor such as a CPU. The software function unit is an electronic control unit (ECU) including a processor such as a CPU, a ROM for storing a program, a RAM for temporarily storing data, and various electronic circuits. At least a part of the control device 31b may include an integrated circuit such as a large scale integration (LSI).

The control device 31b controls transfer of information and power supply via the terminal 31c that comes into contact with the contact 22b of the contact type IC card 14a inserted into the insertion slot 31a.

An outer shape of the support member 32 is, for example, an inclined table shape. The support member 32 is installed on the installation surface 11A of the installation table 11. The support member 32 has a flat inclined surface 32A that supports the insertion portion 31. The inclined surface 32A intersects the horizontal plane at an acute angle. The inclined surface 32A supports the insertion portion 31 with the insertion slot 31a of the insertion portion 31 facing obliquely upward with respect to the vertical direction. In the support member 32, the insertion direction D of the IC card 14a with respect to the insertion portion 31 disposed on the inclined surface 32A is set to be lowered to the front.

An intersection angle (first intersection angle) $\theta$ of the insertion direction D with respect to the horizontal plane is the same as an intersection angle between the inclined surface 32A and the horizontal plane. The first intersection angle $\theta$ is a predetermined acute angle at which the fingers 16 of the person 15 do not interfere with the installation surface 11A when the IC card 14a is inserted into the insertion portion 31. The predetermined acute angle may be, for example, a constant angle in a range of 20 degrees or more and less than 90 degrees.

As described above, in the above-described embodiment, the support member 32 in which the insertion portion 31 is inclined so that the fingers 16 of the person 15 do not interfere with the installation surface 11A when the IC card 14a is inserted into the insertion portion 31 is provided. Therefore, unnaturalness of a motion and posture of a wrist 17 of the person 15 can be suppressed.

The reader/writer 10 includes the support member 32 that handles the first holding method and the second holding method. Therefore, even when insertion of the IC card 14a is performed in parallel with the fingerprint authentication by the biometric authentication sensor 23, unnaturalness of a motion and posture of the wrist 17 of the person 15 can be suppressed.

The reader/writer 10 has the support member 32 that causes the intersection angle $\theta$ of the insertion direction D with respect to the horizontal plane to be 20 degrees or more. Therefore, the IC card 14a can be inserted into the insertion portion 31 by a natural motion and posture of the fingers 16 and the wrist 17 of the person 15.

Hereinafter, modified examples will be described.

In the above-described embodiment, the intersection angle (the first intersection angle) $\theta$ of the insertion direction D with respect to the horizontal plane has been described as a constant predetermined acute angle, but the present invention is not limited thereto. For example, the first intersection angle $\theta$ may be changed according to a predetermined parameter.

Figure 5:
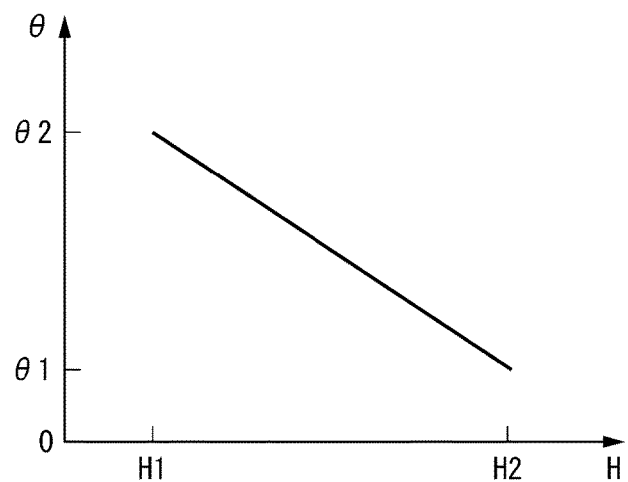
FIG. 5 is a graph showing an example of a correspondence relationship between a height of an installation surface on which a reader/writer of a first modified example of the embodiment is installed and an intersection angle (first intersection angle) of the insertion direction of the IC card into the reader/writer with respect to a horizontal plane.

FIG. 5 is a graph showing an example of a correspondence relationship between the height H of the installation surface 11A on which the reader/writer 10 of a first modified example of the embodiment is installed and the intersection angle (the first intersection angle) $\theta$ of the insertion direction D of the IC card 14a into the reader/writer 10 with respect to the horizontal plane.

As shown in FIG. 5, in the first modified example of the embodiment, the first intersection angle $\theta$ has a relationship in which the first intersection angle $\theta$ decreases as the height H of the installation surface 11A from the reference surface 12 in the vertical direction increases. For example, the first intersection angle $\theta$ has a relationship in which the first intersection angle $\theta$ gradually decreases from a second acute angle $\theta 2$ to the first acute angle $\theta 1$ ($<\theta 2$) as the height H increases from a first height H1 to a second height H2 ($>$H1).

As described above, the reader/writer 10 of the first modified example has the support member 32 whose intersection angle $\theta$ changes according to the height H of the installation surface 11A. Therefore, the IC card 14a can be inserted into the insertion portion 31 by a natural motion and posture of the fingers 16 and the wrist 17 of the person 15 regardless of the height H of the installation surface 11A.

In the above-described embodiment, the reader/writer 10 has been described as handling the contact type IC card 14a, but the present invention is not limited thereto. For example, the reader/writer 10 may handle a non-contact type IC card 14b.

Figure 6:
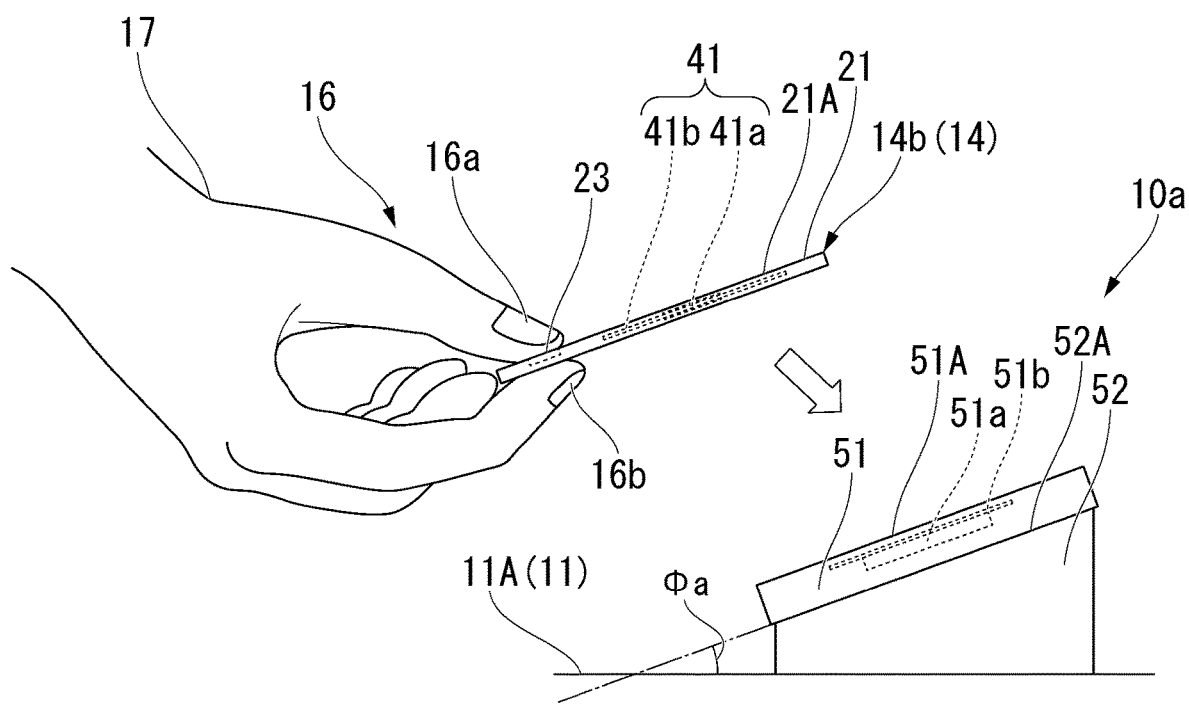
FIG. 6 is a view showing an example of a third holding method of the IC card that is put over a reader/writer of a second modified example of the embodiment.
Figure 7:
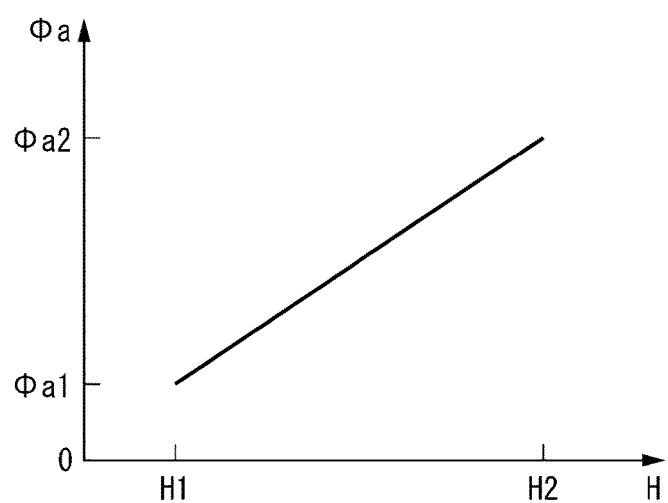
FIG. 7 is a graph showing an example of a correspondence relationship between a height of the installation surface on which the reader/writer of the second modified example of the embodiment is installed and an intersection angle (second intersection angle) of a reading surface of the reader/writer with respect to the horizontal plane.

FIG. 6 is a view showing an example of a third holding method of the 1C card 14b that is put over a reader/writer 10a in a second modified example of the embodiment. FIG. 7 is a graph showing an example of a correspondence relationship between the height H of the installation surface 11A on which the reader/writer 10a of the second modified example of the embodiment is installed and an intersection angle (a second intersection angle) Φa of a reading surface 51A of the reader/writer 10a with respect to the horizontal plane.

As shown in FIG. 6, the reader/writer 10a in the second modified example of the embodiment handles the non-contact type IC card 14b. The non-contact type IC card 14b includes the support base 21, and an IC module 41 and the biometric authentication sensor 23 provided on the support base 21.

The IC module 41 includes an IC chip 41a and an antenna (card-side antenna) 41b disposed inside the support base 21. The IC chip 41a includes a ROM, a RAM, and a CPU. The ROM is a non-volatile memory such as an EEPROM or a flash ROM that holds information in the absence of power supply. The antenna 41b is a metal wire having a predetermined shape.

For example, in the case of the third holding method shown in FIG. 7, the IC card 14b is sandwiched by the thumb 16a and the index finger 16b from both sides in the thickness direction, and the thumb 16a supports the IC card 14b from above in the vertical direction. In the case of the third holding method, the biometric authentication sensor 23 performs fingerprint authentication of the thumb 16a on the first surface 21A side of the IC card 14b.

The reader/writer 10a of the second modified example of the embodiment includes a main body 51 having the reading surface 51A and a support member 52 for supporting the main body 51.

An outer shape of the main body 51 may be, for example, a rectangular plate shape. The main body 51 includes the reading surface 51A over which the IC card 14b is put, a control device 51a, and an antenna (reader-side antenna) 51b.

The control device 51a is a software function unit that functions when a predetermined program is executed by a processor such as a CPU. The software function unit is an ECU including a processor such as a CPU, a ROM for storing a program, a RAM for temporarily storing data, and various electronic circuits. At least a part of the control device 51a may include an integrated circuit such as an LSI. The antenna 51b is a metal wire having a predetermined shape.

The control device 51a controls transfer of information and power supply via the antenna (reader-side antenna) 51b that performs transmission and reception with the antenna (card-side antenna) 41b of the non-contact type IC card 14b that is put over the reading surface 51A.

An outer shape of the support member 52 is, for example, an inclined table shape. The support member 52 is installed on the installation surface 11A of the installation table 11. The support member 52 has a flat inclined surface 52A for supporting the main body 51. The inclined surface 52A intersects the horizontal plane at an acute angle. In the support member 52, the reading surface 51A of the main body 51 disposed on the inclined surface 52A is set to be inclined upward to the front.

The intersection angle (the second intersection angle) Φa between the reading surface 51A and the horizontal plane is the same as an intersection angle between the inclined surface 52A and the horizontal plane. The second intersection angle Φa is a predetermined acute angle which is configured so that an angle change from an angle of the wrist 17 of the person 15 at the time of a reference posture in a relaxed state to an angle of the wrist 17 when the IC card 14b is put over the reading surface 51A is within a predetermined angle range. The reference posture in a relaxed state refers to a natural posture of the body in which strength in arms and the wrists 17 is made to leave (in a relaxed state) and the arms are hung down. The predetermined angle range is, for example, in a range of ±5 degrees in posture change corresponding to a motion such as bending and stretching from the reference posture of the wrist 17 in the relaxed state. The predetermined acute angle is a constant angle in a range of, for example, 20 degrees or more and less than 90 degrees, or changes according to a predetermined parameter.

For example, as shown in FIG. 7, in the second modified example of the embodiment, the second intersection angle Φa increases as the height H of the installation surface 11A from the reference surface 12 in the vertical direction increases. For example, the second intersection angle Φa gradually increases from the first acute angle Φa1 to the second acute angle Φa2 (>Φa1) as the height H increases from the first height H1 to the second height H2 (>H1).

As described above, the reader/writer 10a of the second modified example has the support member 52 in which the main body 51 is inclined so that an angle change from an angle of the wrist 17 of the person 15 at the time of the reference posture in the relaxed state to an angle of the wrist 17 when the IC card 14b is put over the reading surface 51A is within the predetermined angle range. Therefore, unnaturalness of a motion and posture of the wrist 17 of the person 15 can be suppressed.

The reader/writer 10a of the second modified example has the support member 52 in which the predetermined angle range is set in a range of ±5 degrees in posture change corresponding to a motion such as bending and stretching from the reference posture of the wrist 17 in the relaxed state. Therefore, the IC card 14b can be put over the reading surface 51A by a natural motion and posture of the fingers 16 and the wrist 17 of the person 15.

The reader/writer 10a of the second modified example has a support member 52 that handles the third holding method. Therefore, even when putting-over of the IC card 14b is performed in parallel with the fingerprint authentication by the biometric authentication sensor 23, unnaturalness of a motion and posture of the wrist 17 of the person 15 can be suppressed.

The reader/writer 10a of the second modified example has the support member 52 whose intersection angle Φa changes according to the height H of the installation surface 11A. Therefore, the IC card 14b can be put over the reading surface 51A by a natural motion and posture of the fingers 16 and the wrist 17 of the person 15 regardless of the height H of the installation surface 11A.

In the second modified example of the above-described embodiment, the reader/writer 10a has been described as corresponding to the third holding method of the non-contact type IC card 14b, but the present invention is not limited thereto. For example, the reader/writer 10a may handle a fourth holding method of the non-contact type IC card 14b.

Figure 8:
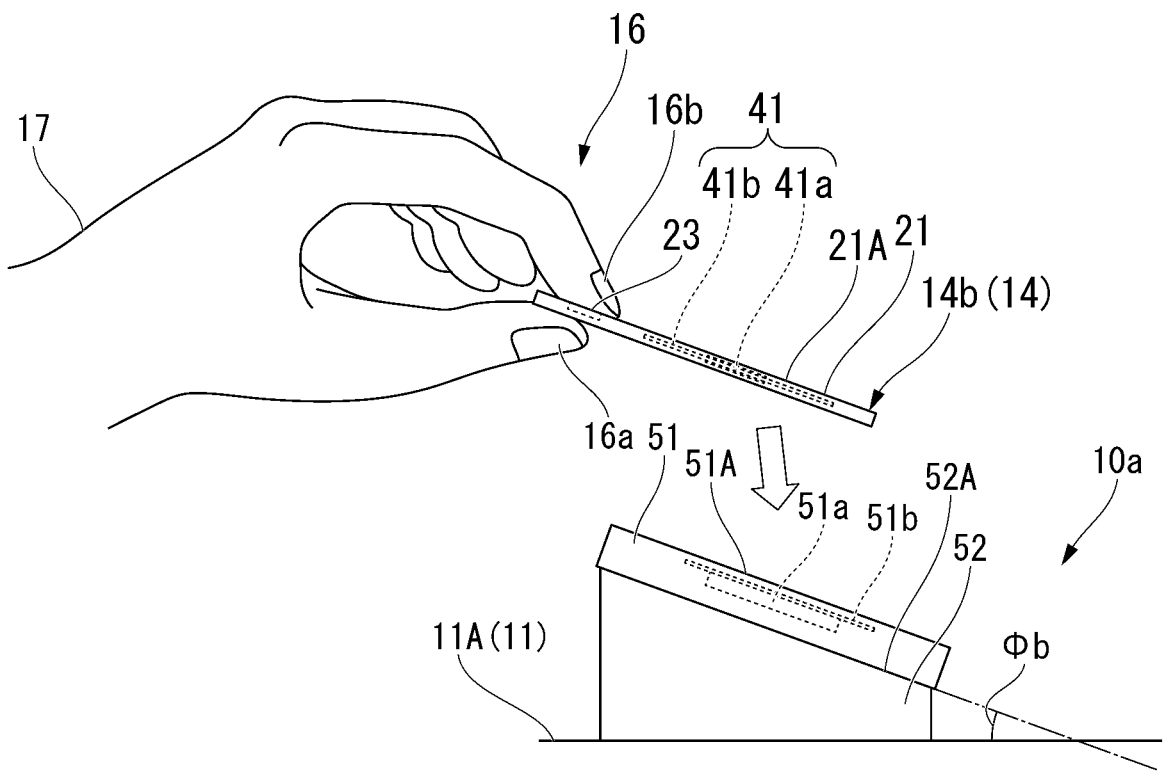
FIG. 8 is a view showing an example of a fourth holding method of the IC card that is put over the reader/writer of a third modified example of the embodiment.
Figure 9:
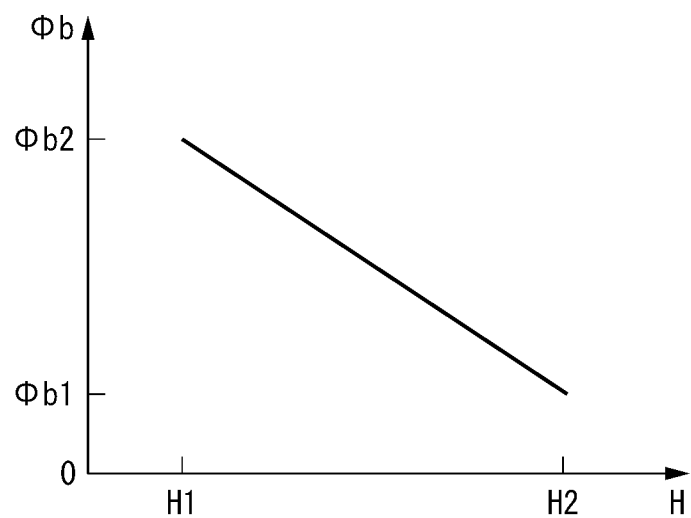
FIG. 9 is a graph showing an example of a correspondence relationship between a height of the installation surface on which the reader/writer of the third modified example of the embodiment is installed and an intersection angle (third intersection angle) of the reading surface of the reader/writer with respect to the horizontal plane.

FIG. 8 is a view showing an example of the fourth holding method of the IC card 14b that is put over the reader/writer 10b of the third modified example of the embodiment. FIG. 9 is a graph showing an example of a correspondence relationship between the height H of the installation surface 11A on which the reader/writer 10b of the third modified example of the embodiment is installed and an intersection angle (a third intersection angle) Φb of the reading surface 51A of the reader/writer 10b with respect to the horizontal plane.

For example, in the case of the fourth holding method shown in FIG. 8, the 1C card 14b is sandwiched by the thumb 16a and the index finger 16b from both sides in the thickness direction, and the thumb 16a supports the IC card 14b from below in the vertical direction. In the fourth holding method, the biometric authentication sensor 23 performs fingerprint authentication of the index finger 16b on the first surface 21A side of the IC card 14b.

In the third modified example of the embodiment, in the support member 52 of the reader/writer 10b, the reading surface 51A of the main body 51 disposed on the inclined surface 52A is set to be lowered to the front.

The intersection angle (the third intersection angle) Φb between the reading surface 51A and the horizontal plane is the same as the intersection angle between the inclined surface 52A and the horizontal plane. The third intersection angle Φb is a predetermined acute angle which is configured so that an angle change from an angle of the wrist 17 of the person 15 at the time of the reference posture in the relaxed state to an angle of the wrist 17 when the IC card 14b is put over the reading surface 51A is within a predetermined angle range. The predetermined angle range is, for example, in a range of ±5 degrees in posture change corresponding to a motion such as bending and stretching from the reference posture of the wrist 17 in the relaxed state. The predetermined acute angle is a constant angle in a range of, for example, 20 degrees or more and less than 90 degrees, or changes according to a predetermined parameter.

For example, as shown in FIG. 9, in the third modified example of the embodiment, the third intersection angle Φb decreases as the height H of the installation surface 11A from the reference surface 12 in the vertical direction increases. For example, the third intersection angle Φb gradually decreases from the second acute angle Φb2 to the first acute angle Φb1 (<Φb2) as the height H increases from the first height H1 to the second height H2 (>H1).

As described above, the reader/writer 10b of the third modified example has the support member 52 that handles the fourth holding method. Therefore, even when putting-over of the IC card 14b is performed in parallel with the fingerprint authentication by the biometric authentication sensor 23, unnaturalness of a motion and posture of the wrist 17 of the person 15 can be suppressed.

Also, the reader/writer 10b of the third modified example has the support member 52 in which the main body 51 is inclined so that an angle change at the time of putting the IC card 14b over the reading surface 51A from the reference posture of the wrist 17 of the person 15 in the relaxed state is within the predetermined angle range. Therefore, a natural motion and posture of the wrist 17 of the person 15 can be promoted.

Also, the reader/writer 10b has the support member 52 whose intersection angle Φb changes according to the height H of the installation surface 11A. Therefore, the IC card 14b can be put over the reading surface 51A by a natural motion and posture of the fingers 16 and the wrist 17 of the person 15 regardless of the height H of the installation surface 11A.

In the above-described embodiment and modified examples, the reader/writer 10 has been described as having the support member 32 or 52 in which the intersection angle θ, Φa, or Φb of the inclined surface 32A or 52A with respect to the horizontal plane is constant, but the present invention is not limited thereto. For example, the reader/writer 10 may include an angle changing mechanism for changing the intersection angle θ, Φa, or Φb. For example, the angle changing mechanism may be a ball joint mechanism, a ratchet mechanism, or the like.

Figure 10:
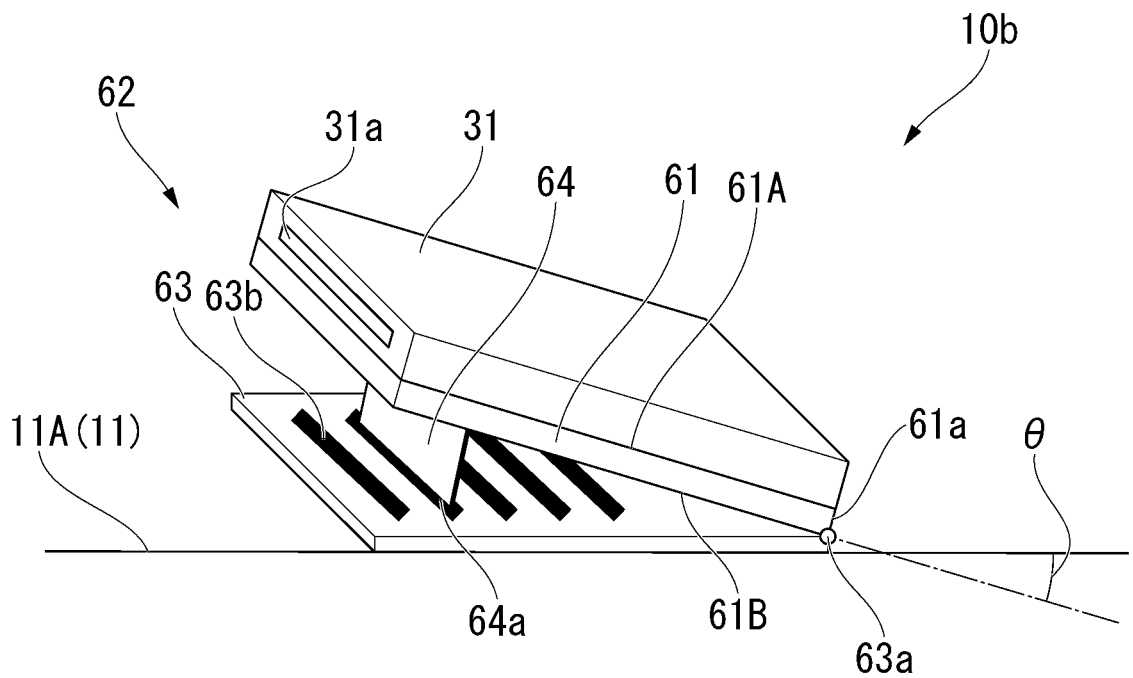
FIG. 10 is a perspective view schematically showing a configuration of a reader/writer of a fourth modified example of the embodiment.

FIG. 10 is a perspective view schematically showing a configuration of the reader/writer 10b of a fourth modified example of the embodiment.

As shown in FIG. 10, in the fourth modified example of the embodiment, the reader/writer 10b includes the insertion portion 31, a support member 61 that supports the insertion portion 31, and an angle changing mechanism 62 that changes an intersection angle (inclination) of the support member 61 with respect to the horizontal plane.

An outer shape of the support member 61 is, for example, a rectangular plate. The support member 61 has a flat inclined surface 61A that supports the insertion portion 31. The inclined surface 61A intersects the horizontal plane at an acute angle by the angle changing mechanism 62. The inclined surface 61A supports the insertion portion 31 with the insertion slot 31a of the insertion portion 31 facing obliquely upward with respect to the vertical direction.

The angle changing mechanism 62 includes a bottom portion 63 and a stand member 64 that is engaged with the bottom portion 63.

An outer shape of the bottom portion 63 is, for example, a plate shape. The bottom portion 63 is installed on the installation surface 11A of the installation table 11. The bottom portion 63 includes a connection member 63a. The connection member 63a may be, for example, a hinge or the like. The connection member 63a is connected to an end portion 61a of the support member 61. The support member 61 rotates around the end portion 61a connected to the connection member 63a.

A plurality of positioning portions 63b are formed on a surface of the bottom portion 63. An outer shape of the positioning portions 63b is, for example, a recessed shape or a protruding shape. The positioning portion 63b each fix a distal end portion 64a of the stand member 64 by coining into contact with the distal end portion 64a.

An outer shape of the stand member 64 is, for example, a rectangular plate shape. A base end portion (not shown) of the stand member 64 is connected to a surface 61B on a side of both sides of the support member 61 in the thickness direction opposite to the inclined surface 61A by, for example, a connection member (not shown) such as a hinge. The stand member 64 rotates around the base end portion (not shown) connected to the connection member (not shown).

The angle changing mechanism 62 changes an intersection angle of the inclined surface 61A of the support member 61 with respect to the horizontal plane by changing the positioning portion 63b in contact with the distal end portion 64a of the stand member 64. In the angle changing mechanism 62, the insertion direction D of the IC card 14a with respect to the insertion portion 31 disposed on the inclined surface 61A of the support member 61 is set to be lowered to the front.

An intersection angle (first intersection angle) θ of the insertion direction D with respect to the horizontal plane is the same as the intersection angle between the inclined surface 61A and the horizontal plane. The first intersection angle θ is a predetermined acute angle at which the fingers 16 of the person 15 do not interfere with the installation surface 11A when the IC card 14a is inserted into the insertion portion 31.

As described above, the reader/writer 10b of the fourth modified example has the angle changing mechanism 62 that changes the intersection angle between the inclined surface 61A and the horizontal plane. Therefore, a natural motion and posture of the fingers 16 and the wrist 17 holding the IC card 14a can be easily promoted.

In the first modified example of the above-described embodiment, the first intersection angle θ has been described as being changed according to the height H of the installation surface 11A from the reference surface 12 in the vertical direction, but the present invention is not limited thereto. For example, the intersection angles between the inclined surfaces 32A, 52A, and 61A and the horizontal plane in the above-described embodiment and modified examples may be changed according to a plurality of predetermined parameters.

Figure 11:
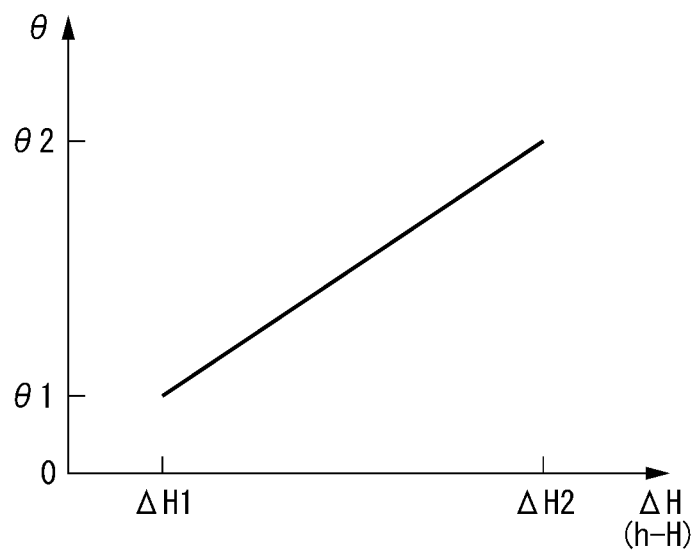
FIG. 11 is a graph showing an example of a correspondence relationship between a height of the installation surface on which the reader/writer of a fifth modified example of the embodiment is installed, a body height h of a person of the IC card, and an intersection angle (first intersection angle) of the insertion direction of the IC card into the reader/writer with respect to the horizontal plane.

FIG. 11 is a graph showing an example of a correspondence relationship between the height H of the installation surface 11A on which the reader/writer 10 of a fifth modified example of the embodiment is installed, a body height h of the person 15 of the IC card 14, and an intersection angle (first intersection angle) θ of the insertion direction D of the IC card 14 into the reader/writer 10 with respect to the horizontal plane.

As shown in FIG. 11, in the fifth modified example of the embodiment, the first intersection angle θ increases as a difference ΔH (=h−H) between the body height h of the person 15 and the height H of the installation surface 11A from the reference surface 12 in the vertical direction increases. The body height h is, for example, an average body height or the like of a plurality of persons 15. For example, the first intersection angle θ gradually increases from a first acute angle θ1 to a second acute angle θ2 (>θ1) as the difference ΔH increases from a first predetermined value ΔH1 to a second predetermined value ΔH2 (>ΔH1).

The reader/writer 10b in the fifth modified example has the support member 32 whose intersection angle θ changes according to the body height h of the person 15 and the height H of the installation surface 11A. Therefore, a natural motion and posture of the fingers 16 and the wrist 17 of the person 15 can be promoted regardless of the body height h of the person 15 and the height H of the installation surface 11A.

In the above-described embodiment, the reader/writer 10 has been described as being installed on the installation surface 11A of the installation table 11, but the present invention is not limited thereto. For example, the reader/writer 10 may be installed on a surface of a support portion provided on the installation table 11.

Figure 12:
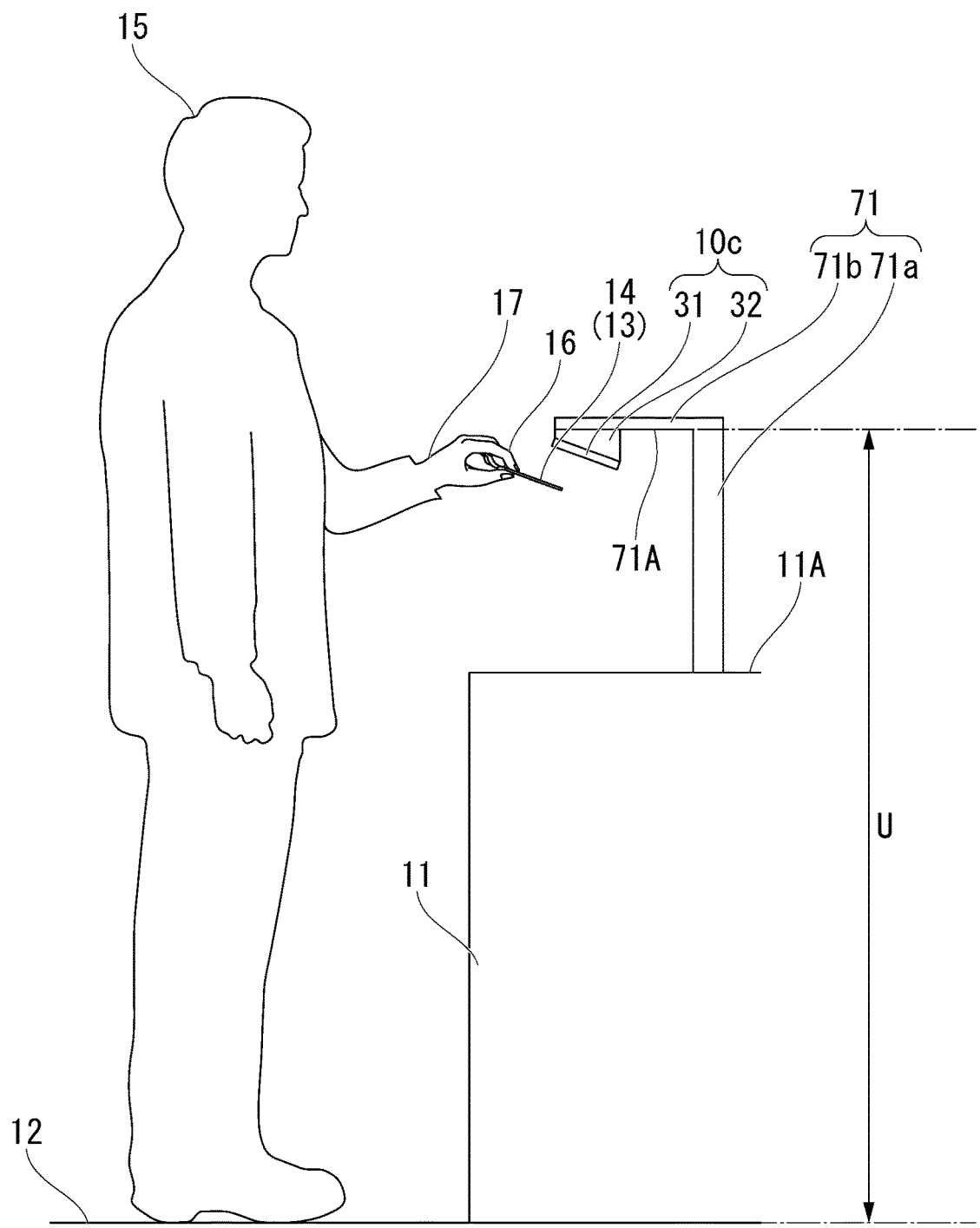
FIG. 12 is a view schematically showing a disposition state of a reader/writer of a sixth modified example of the embodiment.
Figure 13:
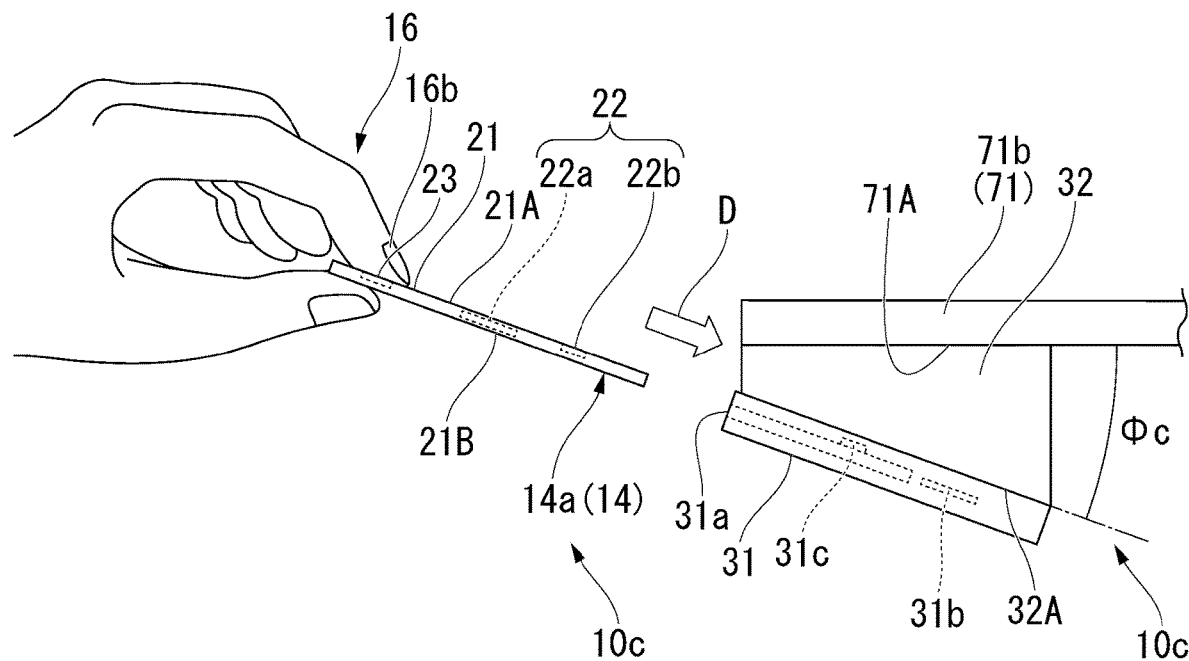
FIG. 13 is a view showing an example of a fifth holding method of the IC card inserted into the reader/writer of the sixth modified example of the embodiment.
Figure 14:
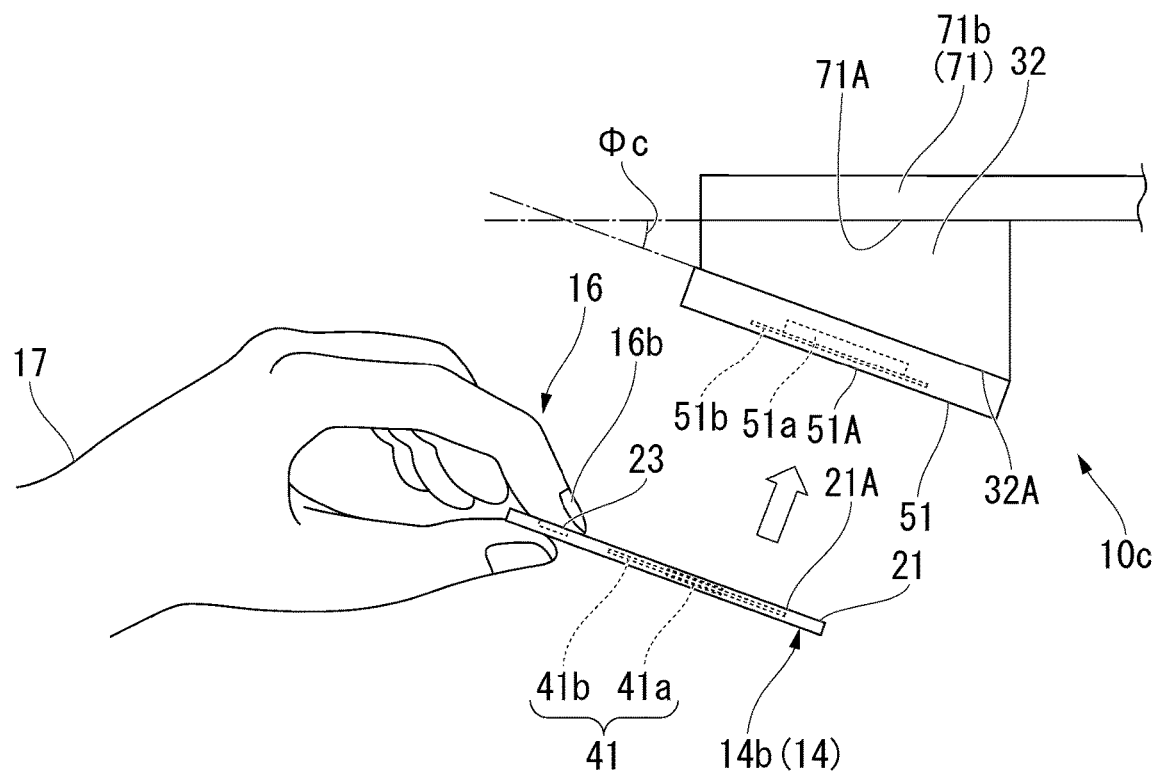
FIG. 14 is a view showing an example of a sixth holding method of the IC card that is put over the reader/writer of the sixth modified example of the embodiment.
Figure 15:
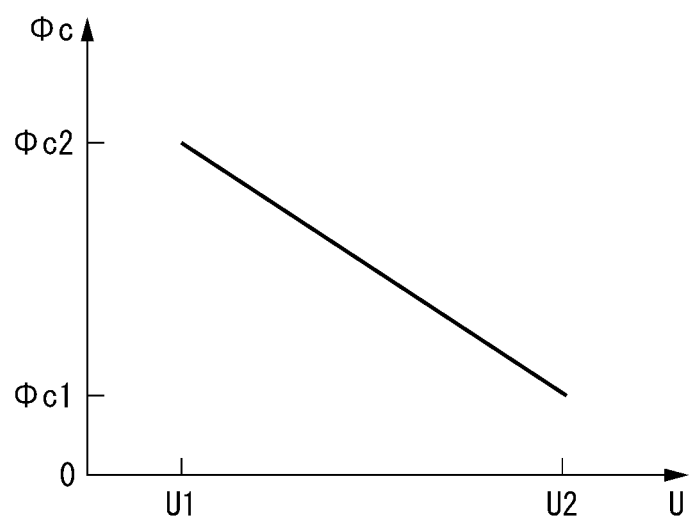
FIG. 15 is a graph showing an example of a correspondence relationship between a height of an installation surface on which the reader/writer of the sixth modified example of the embodiment is installed and an intersection angle (fourth intersection angle) of the insertion direction of the IC card into the reader/writer or the reading surface of the reader/writer with respect to the horizontal plane.

FIG. 12 is a view schematically showing a disposition state of a reader/writer 10c of a sixth modified example of the embodiment. FIG. 13 is a view showing an example of a fifth holding method of the IC card 14 inserted into the reader/writer 10c of the sixth modified example of the embodiment. FIG. 14 is a view showing an example of the fifth holding method of the IC card 14 that is put over the reader/writer 10c of the sixth modified example of the embodiment. FIG. 15 is a graph showing an example of a correspondence relationship between a height U of an installation surface 71A on which the reader/writer 10c of the sixth modified example of the embodiment is installed and an intersection angle (fourth intersection angle) Φc of the insertion direction D of the IC card 14 into the reader/writer 10c or the reading surface 51A of the reader/writer 10c with respect to the horizontal plane.

As shown in FIG. 12, in the sixth modified example of the embodiment, the reader/writer 10c is installed on the installation surface 71A of a support portion 71 provided on the installation table 11.

An outer shape of the support portion 71 is, for example, a rod shape bent in an L shape. The installation surface 71A of the support portion 71 is, for example, a surface facing downward at a distal end portion of an arm portion 71b that protrudes in a horizontal direction from an upper end portion of a leg portion 71a extending in the vertical direction. The height U of the installation surface 71A from the reference surface 12 in the vertical direction is a predetermined height.

As shown in FIGS. 13 and 14, the reader/writer 10c of the sixth modified example of the embodiment includes the insertion portion 31 or the main body 51, and the support member 32.

The support member 32 is installed on the installation surface 71A of the support portion 71. The support member 32 includes the flat inclined surface 32A that supports the insertion portion 31 or the main body 51. The inclined surface 32A intersects the horizontal plane at an acute angle. The inclined surface 32A supports the insertion portion 31 with the insertion slot 31a of the insertion portion 31 facing obliquely upward with respect to the vertical direction. In the support member 32, the insertion direction D of the IC card 14a with respect to the insertion portion 31 disposed on the inclined surface 32A is set to be lowered to the front. The inclined surface 32A supports the main body 51 by setting the reading surface 51A of the main body 51 to be lowered to the front.

For example, in a case of the fifth holding method shown in FIGS. 13 and 14, the IC card 14 (14a and 14b) is sandwiched by the thumb 16a and the index finger 16b from both sides in the thickness direction, and the thumb 16a supports the IC card 14 from below in the vertical direction. In the fifth holding method, the biometric authentication sensor 23 performs fingerprint authentication of the index finger 16b on the first surface 21A side of the IC card 14.

With respect to the insertion portion 31, the intersection angle (fourth intersection angle) Φc of the insertion direction D of the IC card 14a with respect to the horizontal plane is the same as an intersection angle between the inclined surface 32A and the horizontal plane. The fourth intersection angle Φc is a predetermined acute angle at which the fingers 16 of the person 15 do not interfere with the installation surface 71A when the IC card 14a is inserted into the insertion portion 31.

With respect to the main body 51, the intersection angle (fourth intersection angle) Φc between the reading surface 51A and the horizontal plane is the same as the intersection angle between the inclined surface 32A and the horizontal plane. The fourth intersection angle Φc is a predetermined acute angle configured so that an angle change at the time of putting the IC card 14b over the reading surface 51A from the reference posture of the wrist 17 of the person 15 in the relaxed state is within a predetermined angle range. The predetermined angle range is, for example, in a range of ±5 degrees in posture change corresponding to a motion such as bending and stretching from the reference posture of the wrist 17 in the relaxed state.

For example, as shown in FIG. 15, in the sixth modified example of the embodiment, the fourth intersection angle Φc has a relationship in which the fourth intersection angle Φc decreases as the height U of the installation surface 71A from the reference surface 12 in the vertical direction increases. For example, the fourth intersection angle Φc gradually decreases from a second acute angle Φc2 to a first acute angle Φc1 (<Φc2) as the height U increases from a first height U1 to a second height U2 (>U1).

As described above, the reader/writer 10c in the sixth modified example has the support member 32 in which the insertion portion 31 is inclined so that the fingers 16 of the person 15 do not interfere with the installation surface 11A when the IC card 14a is inserted into the insertion portion 31. Therefore, unnaturalness of a motion and posture of the wrist 17 of the person 15 can be suppressed.

The reader/writer 10c has the support member 32 in which the main body 51 is inclined so that an angle change from an angle of the wrist 17 of the person 15 at the time of the reference posture in the relaxed state to an angle of the wrist 17 when the IC card 14b is put over the reading surface 51A is within the predetermined angle range. Therefore, unnaturalness of a motion and posture of the wrist 17 of the person 15 can be suppressed.

The reader/writer 10c has the support member 32 whose intersection angle θ changes according to the height U of the installation surface 71A. Therefore, a natural motion and posture of the fingers 16 and the wrist 17 of the person 15 can be promoted regardless of the height U of the installation surface 71A.

In the above-described embodiment, the insertion portion 31 of the reader/writer 10 has been described as handling the contact type IC card 14a, but the present invention is not limited thereto. For example, the insertion portion 31 of the reader/writer 10 may handle the non-contact type IC card 14b.

The insertion portion 31 handling the non-contact type IC card 14b includes an antenna (reader-side antenna) that performs transmission and reception with an antenna (card-side antenna) of the IC card 14b. The control device 31b of the insertion portion 31 controls transfer of information and power supply via the antenna (reader-side antenna) that performs transmission and reception with the antenna (card-side antenna) of the non-contact type IC card 14b that is inserted into the insertion slot 31a.

In the above-described embodiment and modified examples, the IC chips 22a and 41a of the IC card 14 have been described as including a CPU, but the present invention is not limited thereto, and the CPU may be omitted.

According to at least one embodiment described above, when the support members 32, 52, and 61 having the inclined surfaces 32A, 52A, and 61A intersecting the horizontal plane at a predetermined acute angle are provided, a natural motion and posture of the fingers 16 and the wrist 17 of the person 15 can be promoted when the IC card 14 is inserted or put over.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reader/writer comprising:
an insertion portion into which an information storage medium held by a person with fingers is inserted, the information storage medium including a fingerprint sensor; and
a support member which supports the insertion portion on an installation surface by causing an insertion direction of the information storage medium with respect to the insertion portion to be lowered to the front to intersect with a horizontal plane, and in which an intersection angle between the insertion direction and the horizontal plane is set to a predetermined acute angle at which the fingers of the person do not interfere with the installation surface when the information storage medium is inserted into the insertion portion in a state in which a finger of the person is in contact with the fingerprint sensor.

2. The reader/writer according to claim 1, wherein the predetermined acute angle is 20 degrees or more.

3. The reader/writer according to claim 1, wherein the intersection angle has a relationship in which the intersection angle decreases as a height of the installation surface from a reference surface in a vertical direction increases.

4. A reader/writer comprising:
a main body having a reading surface over which an information storage medium held by a person with fingers is put, the information storage medium including a fingerprint sensor; and
a support member which supports the main body on an installation surface by causing the reading surface to intersect with a horizontal plane, and in which an intersection angle between the reading surface and the horizontal plane is set to be a predetermined acute angle which is configured so that an angle change from an angle of a wrist of the person at the time of a reference posture in a relaxed state to an angle of the wrist when the information storage medium is put over the reading surface is within a predetermined angle range in a state in which a finger of the person is in contact with the fingerprint sensor.

5. The reader/writer according to claim 4, comprising an angle changing mechanism which changes the intersection angle.

6. The reader/writer according to claim 5, wherein the predetermined angle range is a range of ±5 degrees from the reference posture.

7. The reader/writer according to claim 5, wherein the support member is configured so that:
the reading surface is made to be inclined upward to the front to intersect with the horizontal plane and the intersection angle is increased as a height of the installation surface from a reference surface in a vertical direction increases to correspond to a case in which a thumb among the fingers supports the information storage medium from above; and
the reading surface is made to be lowered to the front to intersect with the horizontal plane and the intersection angle is decreased as a height of the installation surface from the reference surface in the vertical direction increases to correspond to a case in which the thumb among the fingers supports the information storage medium from below.

8. The reader/writer according to claim 1, comprising an angle changing mechanism which changes the intersection angle.

* * * * *